(12) United States Patent
Nishio et al.

(10) Patent No.: US 9,739,386 B2
(45) Date of Patent: Aug. 22, 2017

(54) CHECK VALVE ELEMENT AND CHECK VALVE USING THE SAME

(71) Applicants: NITTO KOHKI CO., LTD., Ohta-ku, Tokyo (JP); TOYOTA JIDOSHA KABUSHIKI KAISHA, Toyota-shi, Aichi (JP)

(72) Inventors: Takuya Nishio, Tokyo (JP); Hirofumi Onishi, Toyota (JP)

(73) Assignees: NITTO KOHKI CO., LTD., Tokyo (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 120 days.

(21) Appl. No.: 14/872,855

(22) Filed: Oct. 1, 2015

(65) Prior Publication Data
US 2016/0018013 A1 Jan. 21, 2016

Related U.S. Application Data

(63) Continuation of application No. PCT/JP2014/059810, filed on Apr. 3, 2014.

(30) Foreign Application Priority Data

Apr. 3, 2013 (JP) .................. 2013-077539

(51) Int. Cl.
*F16K 17/04* (2006.01)
*F16K 15/02* (2006.01)
*F16K 15/06* (2006.01)

(52) U.S. Cl.
CPC ........ *F16K 17/0433* (2013.01); *F16K 15/025* (2013.01); *F16K 15/063* (2013.01)

(58) Field of Classification Search
CPC ... F16K 17/0433; F16K 15/025; F16K 15/063
(Continued)

(56) References Cited

U.S. PATENT DOCUMENTS 3,072,143 A * 1/1963 Fleischhacker ....... F16K 15/026
137/514
5,290,096 A 3/1994 Beck et al.
(Continued)

FOREIGN PATENT DOCUMENTS

CN 2357188 Y 1/2000
JP 9-287671 A 11/1997
(Continued)

OTHER PUBLICATIONS

Office Action and English language translation thereof, in corresponding Chinese Application No. 201480019253.1, dated Jul. 29, 2016, 10 pages.
(Continued)

*Primary Examiner* — Craig Schneider
*Assistant Examiner* — P. Macade Nichols
(74) *Attorney, Agent, or Firm* — Brinks Gilson & Lione

(57) ABSTRACT

Provided is a check valve element enabling efficient supply of fluid while suppressing the occurrence of chattering. The check valve element is provided to be displaceable upstream and downstream in a downstream flow path extending downstream from a valve seat having an opening for introducing a fluid and is pressed against the valve seat by a pre-closing urging force applied thereto toward an upstream side. The check valve element has an arresting portion provided on an outer peripheral surface thereof, a sliding resistance imparting member support portion supporting a sliding resistance imparting member such that the sliding resistance imparting member slides along the wall of the downstream flow path when the check valve element is
(Continued)

displaced upstream and downstream, and an urging member support portion supporting an urging member urged upstream so that the urging member urges the sliding resistance imparting member upstream, thereby causing the sliding resistance imparting member to increase in outer diameter while being arrested by the arresting portion.

11 Claims, 3 Drawing Sheets

(58) Field of Classification Search
  USPC .............................. 137/514, 514.3, 540, 535
  See application file for complete search history.

(56) References Cited

U.S. PATENT DOCUMENTS

2005/0051218 A1  3/2005  Oba et al.
2005/0098753 A1  5/2005  Ozaki et al.

FOREIGN PATENT DOCUMENTS

| JP | 2875852 B2 | 3/1999 |
| JP | 2004-46897 A | 2/2004 |
| JP | 2004-225717 A | 8/2004 |
| JP | 2004-270914 A | 9/2004 |
| JP | 2006-207833 A | 8/2006 |
| JP | 2011-7275 A | 1/2011 |
| WO | WO 94/18617 A1 | 8/1994 |

OTHER PUBLICATIONS

Extended Search Report in corresponding European Application No. 14778741.0, dated Oct. 31, 2016, 7 pages.
International Search Report, and English language translation thereof, in corresponding International Application No. PCT/JP2014/059810, dated Jun. 17, 2014, 4 pages.

* cited by examiner

CHECK VALVE ELEMENT AND CHECK VALVE USING THE SAME

RELATED APPLICATIONS

The present application is a continuation application of PCT/JP2014/059810 filed on Apr. 3, 2014, which claims priority to JP2013-077539 filed on Apr. 3, 2013, the entire contents of which are incorporated herein by reference.

BACKGROUND OF THE INVENTION

1. Field of the Invention

The present invention relates to check valves and, more particularly, to what is called a poppet type check valve in which a valve element (check valve element) displaceably provided in a housing and urged to seat on a valve seat is unseated from the valve seat by an upstream-side fluid pressure to permit flow of fluid in one direction from the upstream side toward the downstream side.

2. Description of the Related Art

At a hydrogen supply station for supplying hydrogen to hydrogen automobiles, for example, a female coupling member (socket) at the distal end of a supply hose extending from a station tank storing gaseous or liquid hydrogen under high pressure and low temperature is coupled to a male coupling member (plug) at an outer end of a hydrogen inlet pipe extending from a hydrogen storage tank of a hydrogen automobile to supply hydrogen. The male coupling member is provided therein with a check valve that permits flow only from the supply hose to the hydrogen storage tank of the hydrogen automobile and that blocks the reverse flow.

When a poppet type valve is employed as the above-described check valve, the following problem may arise: As filling of hydrogen into the hydrogen storage tank of the hydrogen automobile progresses, the pressure in the hydrogen storage tank approaches the pressure in the supply hose of the hydrogen supply station, and the pressure difference between the upstream and downstream sides of the check valve decreases. Consequently, urging force that urges the valve element to seat on the valve seat and the pressure difference become equal to each other, so that seating and unseating of the valve element on and from the valve seat are repeated frequently, causing what is called chattering. Such chattering hinders the supply of hydrogen in stable condition and leads to problems such as the occurrence of noise and degradation in durability of the valve element and the valve seat.

To solve the above-described problem, there has been developed a check valve in which a flow path is formed in the valve element to allow fluid flowing in through the valve seat to pass through the flow path, and in which the flow path is configured to have a high flow resistance, thereby preventing the occurrence of a rapid pressure change across the valve element, and thus attempting to solve the above-described problem (Patent Literature 1).

CITATION LIST

Patent Literature

Patent Literature 1: Japanese Patent Application Publication No. 2011-7275

SUMMARY OF THE INVENTION

Technical Problem

The check valve proposed in Patent Literature 1 is effective in suppressing the occurrence of chattering but takes a longer time to supply fluid due to the increase in flow resistance. It is desired that the supply of hydrogen to a hydrogen automobile at a supply station, for example, should be carried out at as high a speed as possible. It is therefore necessary to solve this problem.

The present invention has been made in view of the above-described circumstances, and it is an object of the present invention to provide a check valve enabling efficient supply of fluid while suppressing the occurrence of chattering and to provide a check valve element suitable for the check valve.

Solution to Problem

The present invention provides a check valve element provided to be displaceable upstream and downstream in a downstream flow path defined by a tubular wall extending downstream from a valve seat having an opening for introducing a fluid from an upstream flow path. The check valve element is pressed against the valve seat by a pre-closing urging force applied thereto toward an upstream side. The check valve element has an arresting portion provided on an outer peripheral surface of the check valve element, and a sliding resistance imparting member support portion downstream adjacent to the arresting portion on the outer peripheral surface. The sliding resistance imparting member support portion is configured to support a sliding resistance imparting member such that the sliding resistance imparting member slides along the tubular wall when the check valve element is displaced upstream and downstream. The check valve element further has an urging member support portion downstream of the sliding resistance imparting member support portion on the outer peripheral surface. The urging member support portion is configured to support an urging member urged upstream so that the urging member urges the sliding resistance imparting member upstream, thereby causing the sliding resistance imparting member to increase in outer diameter while being arrested by the arresting portion.

This check valve element is capable of supporting the above-described sliding resistance imparting member. The sliding resistance imparting member is configured to be slidable along the peripheral wall of the downstream flow path, in which the check valve element is provided, thereby allowing a sliding resistance to be produced against the upstream and downstream displacement of the check valve element when displaced by fluctuations of the differential fluid pressure between the upstream and downstream sides of the check valve element, and thus making it possible to suppress the check valve element from being displaced sensitively in response to the above-described differential pressure fluctuations and hence possible to suppress the above-described chattering.

In addition, the present invention provides a check valve including: the above-described check valve element; a housing having the valve seat and the downstream flow path; a sliding resistance imparting member provided over the sliding resistance imparting member support portion of the check valve element to slide along the tubular wall when the check valve element is displaced upstream and downstream; and an urging member provided over the urging member support portion of the check valve element to urge the sliding resistance imparting member upstream, thereby causing the sliding resistance imparting member to increase in outer diameter while being arrested by the arresting portion. The urging member has an engaging member engageable with the sliding resistance imparting member, and a spring member pressing the engaging member toward the sliding resistance imparting member from a downstream side.

This check valve has the sliding resistance imparting member and urging member fitted to the check valve element, as has been stated above, and is therefore capable of offering the same advantages as those stated in regard to the above-described check valve element.

Specifically, the arrangement may be as follows. The engaging member is provided over the outer peripheral surface of the check valve element displaceably toward the upstream side and has a projection on an inner peripheral surface thereof slidable along the outer peripheral surface of the check valve element. The check valve element has a recess on the outer peripheral surface. The recess longitudinally displaceably receives the projection of the engaging member and has a front end edge for stopping forward displacement of the engaging member by engagement of the projection with the front end edge.

The above-described arrangement is configured to prevent excessive deformation of the sliding resistance imparting member to thereby obtain an appropriate sliding resistance from the sliding resistance imparting member and to prolong the serviceable lifetime of the sliding resistance imparting member.

More specifically, the arrangement may be as follows. The engaging member has a pressing portion engageable with the sliding resistance imparting member from the downstream side. The pressing portion has an annular pressing surface surrounding the outer peripheral surface of the check valve element and engageable with the sliding resistance imparting member from the downstream side. The pressing surface is tapered toward the upstream side.

The provision of the above-described tapered pressing surface facilitates the radial deformation of the sliding resistance imparting member.

Specifically, the sliding resistance imparting member may be in the shape of a split ring split at a circumferential point thereof. This facilitates the radial deformation.

The sliding resistance imparting member may be in an annular shape surrounding the outer peripheral surface of the check valve element and have an outer peripheral surface slidable along the tubular wall and a recess formed on the outer peripheral surface of the sliding resistance imparting member to form a gap between the recess and the tubular wall.

Thus, when the sliding resistance imparting member is displaced together with the check valve, the fluid flowing between the sliding resistance imparting member and the peripheral wall of the downstream flow path is allowed to pass through the recess, thereby suppressing contamination in the fluid from entering the area of sliding contact between the sliding resistance imparting member and the peripheral wall, and thus permitting the sliding resistance imparting member to function properly over a long period of time.

Embodiments of the present invention will be explained below based on the accompanying drawings.

DETAILED DESCRIPTION OF THE PREFERRED EMBODIMENTS

Figure 1:
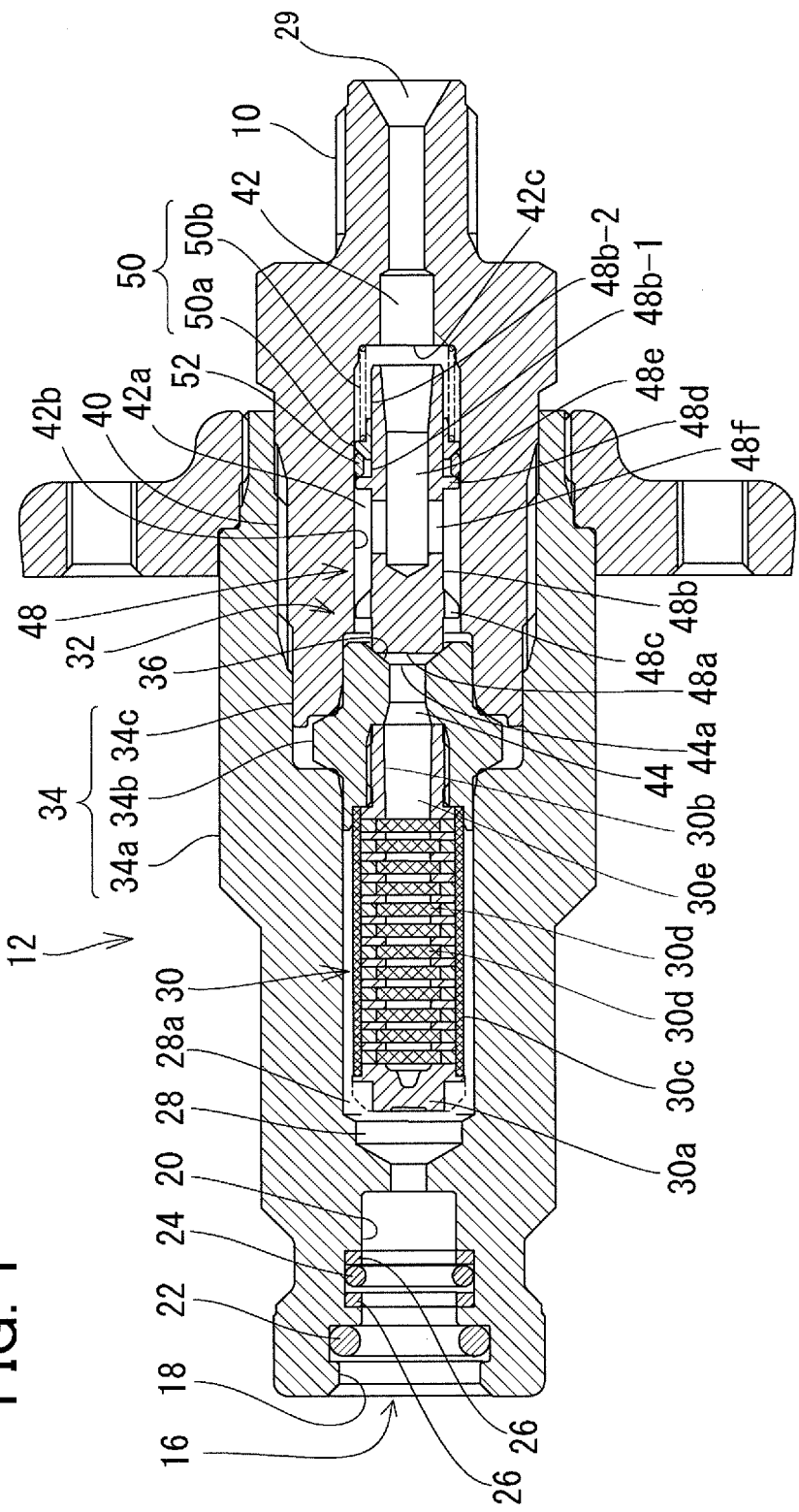
FIG. 1 is a longitudinal sectional view of a plug having a check valve according to the present invention, which is attached to an outer end of a hydrogen inlet pipe of a hydrogen automobile.

FIG. 1 shows a plug (male coupling member) 12 having at a right end (as seen in the figure) thereof a threaded portion 10 thread-connected to an outer end of a hydrogen inlet pipe extending from a hydrogen storage tank of a hydrogen automobile (not shown). The plug 12 is configured such that a socket (female coupling member) provided at the distal end of a hydrogen supply hose at a hydrogen supply station (also not shown) is fitted to the plug 12 from the left side in FIG. 1, thereby being supplied with hydrogen. It should be noted that the socket (female coupling member) and the plug (male coupling member) are assumed as follows: A female coupling member (socket) attached to the distal end of a hydrogen supply hose at a hydrogen supply station is concentrically fittable around a male coupling member (plug) at the outer end of a hydrogen inlet pipe extending from a hydrogen storage tank of a hydrogen automobile. Further, it is assumed that, when the socket is fitted to the plug 12 as stated above, a hydrogen supply nozzle (not shown) extending along the center axis of the socket is inserted into a nozzle insertion port 16 provided at the left end of the plug 12.

Further, in the illustrated example, the nozzle insertion port 16 of the plug 12 has a large-diameter first nozzle receiving portion 18 for receiving a hydrogen supply nozzle of a socket for supplying hydrogen under a relatively low pressure, e.g. 35 MPa, and a small-diameter second nozzle receiving portion 20 for receiving a supply nozzle of a socket for supplying hydrogen under a high pressure, e.g. 70 MPa. The first and second nozzle receiving portions 18 and 20 are provided with an O-ring 22 and an O-ring 24, respectively, and backup rings 26 are provided in front of and behind the O-ring 24, respectively.

The plug 12 has a flow path 28 extending from the nozzle insertion port 16 in the longitudinal direction of the plug. The flow path 28 has an outlet opening 29 at its right end, as seen in the figure. The outlet opening 29 is configured to be communicable with the outer end of a hydrogen inlet pipe extending from a hydrogen storage tank of a hydrogen automobile. The flow path 28 is provided with a filter 30 and a check valve 32 according to the present invention, which are disposed in this order toward the downstream side.

In the illustrated embodiment, a housing 34 defining the flow path 28 of the plug 12 has a tubular housing upstream member 34a defining an upstream flow path 28a of the flow path 28, an annular intermediate member 34b supporting the filter 30 and constituting a valve seat 36 of the check valve 32, and a tubular housing downstream member 34c thread-engaged with the housing upstream member 34a through a threaded portion 40 to secure the intermediate member 34b in the housing 34 and to define a downstream flow path 42 extending from the valve seat 36 to the outlet opening 29.

The filter 30 has a solid upstream end member 30a and a tubular downstream end member 30b and further has a tubular filter member 30c provided between the upstream and downstream end members 30a and 30b and a plurality of disk-shaped filter members 30d provided between the upstream and downstream end members 30a and 30b, being spaced from each other in the longitudinal direction of the filter 30. The downstream end member 30b is threaded into the intermediate member 34b, thereby allowing the filter 30 to be held concentrically with the upstream flow path 28a. Hydrogen supplied into the upstream flow path 28a flows around the outer periphery of the filter 30 and further flows downstream through the tubular filter member 30c, the disk-shaped filter members 30d and an axial flow path 30e in the downstream end member 30b.

The intermediate member 34b has an axial flow path 44 axially aligned with the axial flow path 30e in the downstream end member 30b of the filter 30. The downstream end portion of the axial flow path 44 forms a valve seat 36 that expands as the distance increases downstream. The check valve 32 according to the present invention has the valve seat 36, a check valve element 48 provided in the downstream flow path 42 extending downstream from the valve seat 36 such that the check valve element 48 is displaceable upstream and downstream, and an urging member (coil spring) 50 applying a pre-closing urging force to the check valve element 48 to urge the check valve element 48 upstream so as to press an upstream end portion 48a of the check valve element 48 against the valve seat 36 to close an outlet opening 44a of the axial flow path 44 that is surrounded by the valve seat 36.

Figure 2:
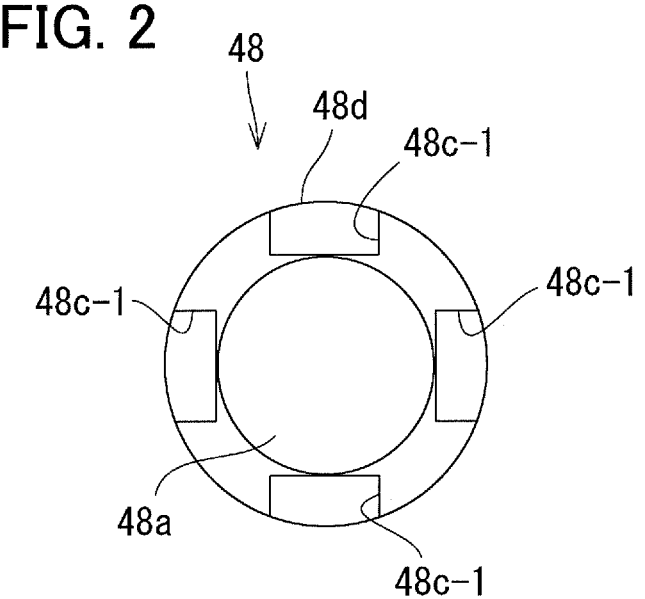
FIG. 2 is an end view of a check valve element in the check valve shown in FIG. 1, as seen from the upstream side.

The check valve element 48 has a first sliding projection 48c provided on an outer peripheral surface 48b near the upstream end portion 48a, a second sliding projection 48d provided on the outer peripheral surface 48b at a position spaced downstream from the sliding projection 48c, an inner flow path 48e extending along the axis of the check valve element 48, and a radial flow path 48f communicating between the inner flow path 48e and a peripheral portion 42a of the downstream flow path 42 surrounding the check valve element 48. The first and second sliding projections 48c and 48d are both annular projections, the outer peripheral surfaces of which face a peripheral wall surface 42b of the downstream flow path 42 across a slight gap. The first and second sliding projections 48c and 48d function as guides when the check valve element 48 is displaced in the downstream flow path 42. The first sliding projection 48c is, as shown in FIG. 2, provided with four circumferentially spaced recesses 48c-1 for passing fluid. Fluid (hydrogen) flowing in downstream from the valve seat 36 passes through the recesses 48c-1 of the first sliding projection 48c and further passes through the radial flow path 48f and the inner flow path 48e to flow toward the outlet opening 29.

Portions of the outer peripheral surface 48b of the check valve element 48 that are downstream of the second sliding projection 48d are defined respectively as a sliding resistance imparting member support portion 48b-1 for supporting an annular sliding resistance imparting member 52 and an urging member support portion 48b-2 for supporting an urging member 50 urging the sliding resistance imparting member 52 toward the second sliding projection 48d. The urging member 50 comprises an annular engaging member 50a slidable over the urging member support portion 48b-2 and engageable with the sliding resistance imparting member 52 from the downstream side, and a spring member 50b pressing the engaging member 50a toward the sliding resistance imparting member 52.

The second sliding projection 48d acts as an arresting portion arresting the sliding resistance imparting member 52 from being displaced upstream by the urging force of the urging member 50, so that the sliding resistance imparting member 52 is deformed radially outward while being arrested by the second sliding projection 48d as an arresting portion in a state where the urging force of the urging member 50 is being applied to the sliding resistance imparting member 52, thereby giving sliding resistance against the upstream and downstream displacement of the check valve element 48.

Figure 3:
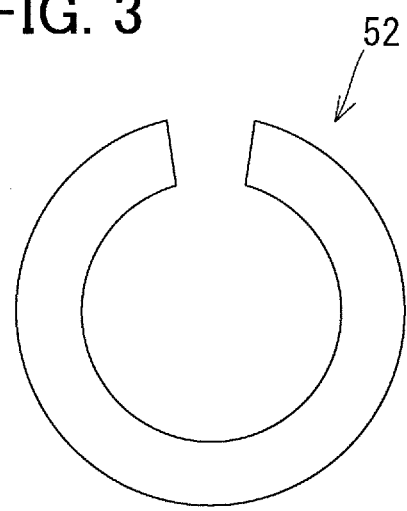
FIG. 3 is an end view of a sliding resistance imparting member attached to the check valve element.
Figure 4:
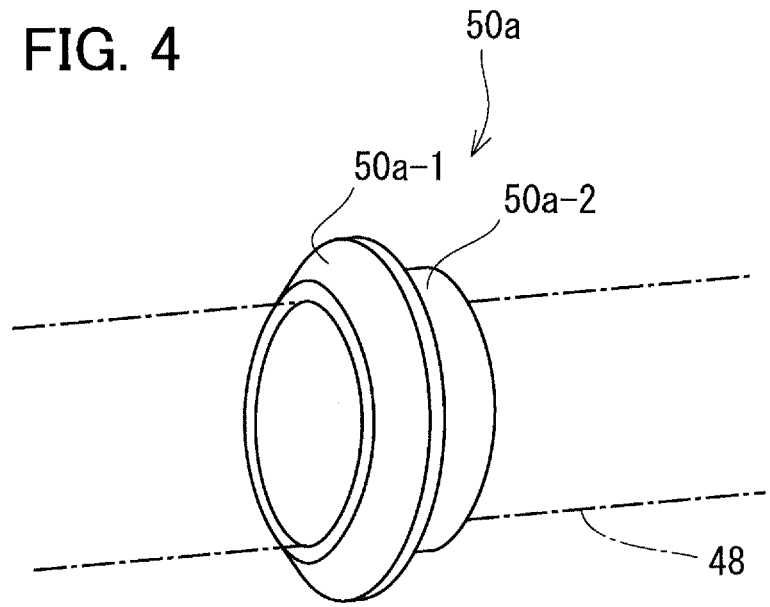
FIG. 4 is a perspective view of an engaging member constituting an urging member urging the sliding resistance imparting member on the check valve element.

More specifically, the sliding resistance imparting member 52 is, as shown in FIG. 3, formed in the shape of a split ring split at a circumferential point thereof. The engaging member 50a has, as shown in FIGS. 1 and 4, an upstream tapered engaging surface 50a-1 engageable with the sliding resistance imparting member 52. The engaging surface 50a-1 extends to the radially inner side of the sliding resistance imparting member 52 to apply radially outward force to the sliding resistance imparting member 52. The sliding resistance imparting member 52 need not necessarily be in the form of a split ring but may be of any form that is radially deformable by being pressed against the second sliding projection 48d as an arresting portion by the urging member 50.

The engaging member 50a has a downstream small-diameter portion 50a-2 for supporting the upstream end of the spring member 50b. The spring member 50b extends downstream from the downstream small-diameter portion 50a-2 and is engaged at the downstream end thereof with a step portion 42c formed in the downstream flow path 42. Thus, the spring member 50b is compressed between the step portion 42c and the engaging member 50a. In the illustrated example, the urging member 50 functions to press the sliding resistance imparting member 52 against the second sliding projection 48d as an arresting portion so that the sliding resistance imparting member 52 expands radially outward, as has been stated above. At the same time, the urging member 50 functions to press the check valve element 48 against the valve seat 36, thereby applying a pre-closing urging force to the check valve element 48, as has been stated above. However, these two functions may be performed by separate urging members, respectively.

Figure 5:
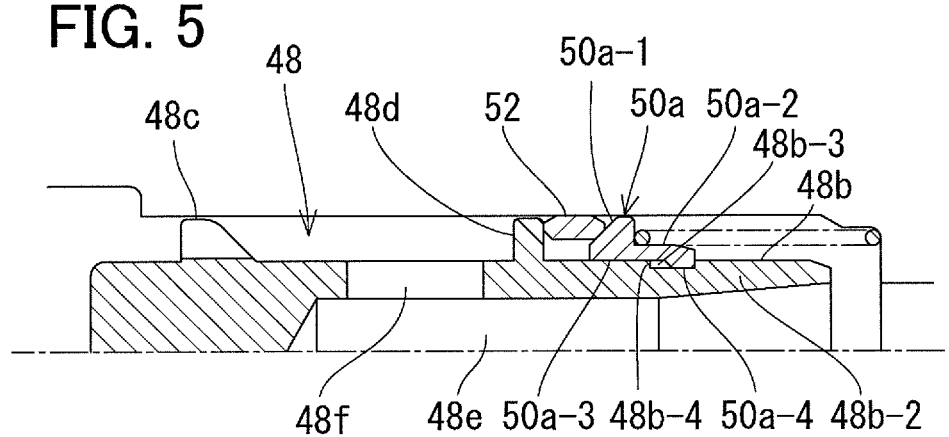
FIG. 5 is a diagram showing a modification of the engaging member shown in FIG. 4.

FIG. 5 shows a modification of the engaging member 50a. The modified engaging member 50a has an annular projection 50a-4 radially inwardly extending along the rear end edge of an inner peripheral surface 50a-3 thereof. The check valve element 48 has an annular recess 48b-4 provided on the outer peripheral surface 48b of the urging member support portion 48b-2 such that the recess 48b-4 longitudinally displaceably receives the projection 50a-4. The projection 50a-4 is movable between a front end edge 48b-5 and rear end edge 48b-6 of the recess 48b-4, so that the engaging member 50a is displaceable only in a predetermined range relative to the check valve element 48. This structure prevents the sliding resistance imparting member 52 from being excessively deformed by the urging of the urging member 50 and also prevents the engaging member 50a from being considerably displaced downstream by the hydrogen pressure applied thereto from the upstream side, which would otherwise make the engaging member 50a unable to properly press the sliding resistance imparting member 52.

As has been stated above, the illustrated plug is attached to the outer end of a hydrogen inlet pipe extending from a hydrogen storage tank of a hydrogen automobile. When the plug is fitted into a socket attached to the distal end of a hydrogen supply hose at a hydrogen supply station, a hydrogen supply nozzle of the socket is inserted into the nozzle insertion port 16, and thus the supply of liquid or gaseous hydrogen is started. Thereupon, the pressure of the supplied hydrogen causes the check valve element 48 to be displaced downstream against the pre-closing urging force applied thereto by the urging member 50, so that the check valve element 48 unseats from the valve seat 36, thereby allowing the supply of hydrogen. As the supply of hydrogen to the hydrogen storage tank of the hydrogen automobile progresses, the pressure in the hydrogen inlet pipe extending from the tank increases, and the difference between the upstream and downstream pressures acting on the check valve element 48 decreases. Eventually, the check valve element 48 is seated on the valve seat by the pre-closing urging force, and the fluid flow path 42 in the plug is closed. When the difference between the upstream and downstream pressures acting on the check valve element 48 decreases close to the pre-closing urging force and becomes equal to the latter, the pressure difference acting on the check valve element 48 fluctuates. However, in the check valve 32 according to the present invention, the check valve element 48 of the check valve 32 is provided with the above-described sliding resistance imparting member 52. Therefore, the check valve element 48 is suppressed from sensitively responding to the pressure fluctuations. As a result, it is possible to suppress the above-described chattering.

Although the check valve according to the present invention has been explained above by way of an embodiment in which the check valve is employed in a plug provided in a hydrogen inlet pipe of a hydrogen automobile, the check valve according to the present invention is not limited thereto but may be used in various fluid pipelines having the problem of chattering.

What is claimed is:
1. A check valve comprising:
a housing having a valve seat and a downstream flow path, wherein the valve seat has an opening for introducing a fluid from an upstream flow path and the downstream flow path is defined by a tubular wall extending downstream from the valve seat;
a check valve element provided to be displaceable upstream and downstream in the downstream flow path;
an urging member provided to press the check valve element against the valve seat with a pre-closing urging force applied thereto toward an upstream side; and
a sliding resistance imparting member;
the check valve element comprising:
an arresting portion provided on an outer peripheral surface of the check valve element;
a sliding resistance imparting member support portion downstream adjacent to the arresting portion on the outer peripheral surface, the sliding resistance imparting member support portion being configured to support the sliding resistance imparting member, which is provided thereover, such that the sliding resistance imparting member slides along the tubular wall when the check valve element is displaced upstream and downstream; and
an urging member support portion downstream of the sliding resistance imparting member support portion on the outer peripheral surface, the urging member support portion being configured to support the urging member;
wherein the urging member is provided over the urging member support portion of the check valve element to urge the sliding resistance imparting member upstream, thereby causing the sliding resistance imparting member to increase in outer diameter while being arrested by the arresting portion;

the urging member having:
an engaging member engageable with the sliding resistance imparting member; and
a spring member pressing the engaging member toward the sliding resistance imparting member from a downstream side;
wherein the engaging member is provided over the outer peripheral surface of the check valve element displaceably toward the upstream side and has a projection on an inner peripheral surface thereof slidable along the outer peripheral surface of the check valve element;
wherein the check valve element has a recess on the outer peripheral surface, the recess longitudinally displaceably receiving the projection of the engaging member, the recess having a front end edge for stopping forward displacement of the engaging member by engagement of the projection with the front end edge.

2. The check valve of claim 1, wherein the engaging member has a pressing portion engageable with the sliding resistance imparting member from a downstream side, the pressing portion having an annular pressing surface surrounding the outer peripheral surface of the check valve element and engageable with the sliding resistance imparting member from the downstream side, the pressing surface being tapered toward the upstream side.

3. The check valve of claim 1, wherein the sliding resistance imparting member is in a shape of a split ring split at a circumferential point thereof.

4. The check valve of claim 3, wherein the sliding resistance imparting member is in an annular shape surrounding the outer peripheral surface of the check valve element and has an outer peripheral surface slidable along the tubular wall and a recess formed on the outer peripheral surface of the sliding resistance imparting member to form a gap between the recess and the tubular wall.

5. The check valve of claim 2, wherein the sliding resistance imparting member is in a shape of a split ring split at a circumferential point thereof.

6. The check valve of claim 5, wherein the sliding resistance imparting member is in an annular shape surrounding the outer peripheral surface of the check valve element and has an outer peripheral surface slidable along the tubular wall and a recess formed on the outer peripheral surface of the sliding resistance imparting member to form a gap between the recess and the tubular wall.

7. A check valve comprising:
a housing having a valve seat and a downstream flow path, wherein the valve seat has an opening for introducing a fluid from an upstream flow path and the downstream flow path is defined by a tubular wall extending downstream from the valve seat;
a check valve element provided to be displaceable upstream and downstream in the downstream flow path;
an urging member provided to press the check valve element against the valve seat with a pre-closing urging force applied thereto toward an upstream side; and
a sliding resistance imparting member;
the check valve element comprising:
an arresting portion provided on an outer peripheral surface of the check valve element;
a sliding resistance imparting member support portion downstream adjacent to the arresting portion on the outer peripheral surface, the sliding resistance imparting member support portion being configured to support the sliding resistance imparting member, which is provided thereover, such that the sliding resistance imparting member slides along the tubular wall when the check valve element is displaced upstream and downstream; and an urging member support portion downstream of the sliding resistance imparting member support portion on the outer peripheral surface, the urging member support portion being configured to support an urging member;

wherein the urging member is provided over the urging member support portion of the check valve element to urge the sliding resistance imparting member upstream, thereby causing the sliding resistance imparting member to increase in outer diameter while being arrested by the arresting portion;

the urging member having:

an engaging member engageable with the sliding resistance imparting member; and a spring member pressing the engaging member toward the sliding resistance imparting member from a downstream side;

wherein the engaging member has a pressing portion engageable with the sliding resistance imparting member from a downstream side, the pressing portion having an annular pressing surface surrounding the outer peripheral surface of the check valve element and engageable with the sliding resistance imparting member from the downstream side, the pressing surface being tapered toward the upstream side.

8. The check valve of claim 7, wherein the sliding resistance imparting member is in a shape of a split ring split at a circumferential point thereof.

9. The check valve of claim 8, wherein the sliding resistance imparting member is in an annular shape surrounding the outer peripheral surface of the check valve element and has an outer peripheral surface slidable along the tubular wall and a recess formed on the outer peripheral surface of the sliding resistance imparting member to form a gap between the recess and the tubular wall.

10. A check valve comprising:

a housing having a valve seat and a downstream flow path, wherein the valve seat has an opening for introducing a fluid from an upstream flow path and the downstream flow path is defined by a tubular wall extending downstream from the valve seat;

a check valve element provided to be displaceable upstream and downstream in the downstream flow path;

an urging member provided to press the check valve element against the valve seat with a pre-closing urging force applied thereto toward an upstream side; and a sliding resistance imparting member;

the check valve element comprising:

an arresting portion provided on an outer peripheral surface of the check valve element;

a sliding resistance imparting member support portion downstream adjacent to the arresting portion on the outer peripheral surface, the sliding resistance imparting member support portion being configured to support the sliding resistance imparting member, which is provided thereover, such that the sliding resistance imparting member slides along the tubular wall when the check valve element is displaced upstream and downstream; and an urging member support portion downstream of the sliding resistance imparting member support portion on the outer peripheral surface, the urging member support portion being configured to support an urging member;

wherein the urging member is provided over the urging member support portion of the check valve element to urge the sliding resistance imparting member upstream, thereby causing the sliding resistance imparting member to increase in outer diameter while being arrested by the arresting portion;

the urging member having:

an engaging member engageable with the sliding resistance imparting member; and a spring member pressing the engaging member toward the sliding resistance imparting member from a downstream side;

wherein the sliding resistance imparting member is in a shape of a split ring split at a circumferential point thereof.

11. The check valve of claim 10, wherein the sliding resistance imparting member is in an annular shape surrounding the outer peripheral surface of the check valve element and has an outer peripheral surface slidable along the tubular wall and a recess formed on the outer peripheral surface of the sliding resistance imparting member to form a gap between the recess and the tubular wall.

* * * * *